US008667413B2

(12) United States Patent
Cheng et al.

(10) Patent No.: US 8,667,413 B2
(45) Date of Patent: Mar. 4, 2014

(54) APPARATUS AND METHOD FOR INFORMATION INPUT IN AN ELECTRONIC DEVICE WITH DISPLAY

(75) Inventors: Kok Hoong Vincent Cheng, Singapore (SG); Teck Chee Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 742 days.

(21) Appl. No.: 12/031,314

(22) Filed: Feb. 14, 2008

(65) Prior Publication Data

US 2009/0210815 A1 Aug. 20, 2009

(51) Int. Cl.
*G06F 3/048* (2013.01)
*G06F 3/033* (2013.01)

(52) U.S. Cl.
USPC ............ 715/773; 715/780; 715/856; 345/160

(58) Field of Classification Search
USPC .................. 715/763, 773, 856, 780; 345/160
See application file for complete search history.

(56) References Cited

U.S. PATENT DOCUMENTS

| | | | | |
|---|---|---|---|---|
| 5,805,157 A | * | 9/1998 | Bertram et al. | 715/773 |
| 6,011,542 A | * | 1/2000 | Durrani et al. | 345/156 |
| 6,486,870 B1 | * | 11/2002 | Kozu | 345/157 |
| 6,556,222 B1 | * | 4/2003 | Narayanaswami | 715/786 |
| 6,580,414 B1 | * | 6/2003 | Wergen et al. | 345/156 |
| 6,608,648 B1 | * | 8/2003 | Bean | 348/211.7 |
| 6,744,427 B2 | * | 6/2004 | Maglio et al. | 345/184 |
| 6,956,559 B2 | * | 10/2005 | Hagiwara et al. | 345/156 |
| 6,963,332 B1 | * | 11/2005 | Watanabe | 345/161 |
| 7,404,146 B2 | * | 7/2008 | Bennetts et al. | 715/762 |
| 7,424,683 B2 | * | 9/2008 | Van Leeuwen | 715/759 |
| 7,574,672 B2 | * | 8/2009 | Jobs et al. | 715/830 |
| 7,667,148 B2 | * | 2/2010 | Mansfield et al. | 200/5 R |
| 7,860,536 B2 | * | 12/2010 | Jobs et al. | 455/566 |
| 8,060,840 B2 | * | 11/2011 | Billow et al. | 715/825 |
| 8,151,209 B2 | * | 4/2012 | Law et al. | 715/773 |
| 8,294,667 B2 | * | 10/2012 | Longe et al. | 345/156 |
| 2005/0210402 A1 | * | 9/2005 | Gunn et al. | 715/773 |
| 2005/0268251 A1 | * | 12/2005 | Bennetts et al. | 715/810 |
| 2006/0139320 A1 | * | 6/2006 | Lang | 345/156 |
| 2006/0277503 A1 | * | 12/2006 | Maehiro et al. | 715/856 |
| 2007/0205983 A1 | * | 9/2007 | Naimo | 345/160 |
| 2007/0209016 A1 | * | 9/2007 | Takayama et al. | 715/780 |
| 2007/0268251 A1 | * | 11/2007 | Edmunds | 345/161 |

\* cited by examiner

*Primary Examiner* — Nicholas Ulrich

(74) *Attorney, Agent, or Firm* — Creative Technology Ltd

(57) ABSTRACT

A method, and apparatus is disclosed for input of information in an electronic device having a display, the apparatus comprising a graphic processor for displaying a plurality of objects on the display representative of the information to be input, each object of the plurality of objects arranged around the perimeter of a portion of the screen area of the display; a control interface for a user to control movement of a cursor generated in the display by the graphic processor and responsive to the control interface for scrolling through the plurality of objects and selection of an object for input of information.

9 Claims, 6 Drawing Sheets

APPARATUS AND METHOD FOR INFORMATION INPUT IN AN ELECTRONIC DEVICE WITH DISPLAY

FIELD OF THE INVENTION

This invention relates generally to an apparatus and method for input of information in an electronic device having a display, and more particularly to an apparatus and method with a information input mechanism in a portable device having a display for graphically displaying objects representative of the information to be input and a control interface to scroll and select one of the displayed objects.

BACKGROUND

In recent years consumer demand for affordable and user-friendly portable multimedia players and devices has increased. Consumers expect the device to be palm-sized and to have a large display relative to the size of the device with user-friendly information and data entry mechanisms. A problem faced in the industry is to meet the expectations of the consumers within the confines of the size of the device where space or the "real estate" of the device is a premium. The conflict is in space allocation to the display and the data entry mechanism on the device.

In some instances, a need to incorporate a virtual keyboard into the display for the input of text has led to clustering of keys in the display. This clustering of keys typically adversely affects the precision of how a desired key is selected, and this lack of precision is a bane of many consumers of such portable multimedia players and devices.

In this regard, there is a need for an apparatus and method for inputting information into an electronic device that addresses the aforementioned conflict and problem to meet consumer expectation and demand.

SUMMARY

An aspect of the invention provides an apparatus for input of information in an electronic device having a display, the apparatus comprising a graphic processor for displaying a plurality of objects on the display representative of the information to be input, each object of the plurality of objects arranged around the perimeter of a portion of the screen area of the display; a control interface for a user to control movement of a cursor generated in the display by the graphic processor and responsive to the control interface for scrolling through the plurality of objects and selection of an object for input of information.

An aspect of the invention provides a method of input of information in an electronic device having a display, the method comprising displaying with a graphic processor a plurality of objects on the display representative of the information to be input, each object of the plurality of objects arranged around the perimeter of a portion of the screen area of the display; controlling movement with a controller interface of a cursor generated in the display by the graphic processor and responsive to the control interface for scrolling through the plurality of objects and selection of an object for input of information.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which.

DETAILED DESCRIPTION

Figure 1:
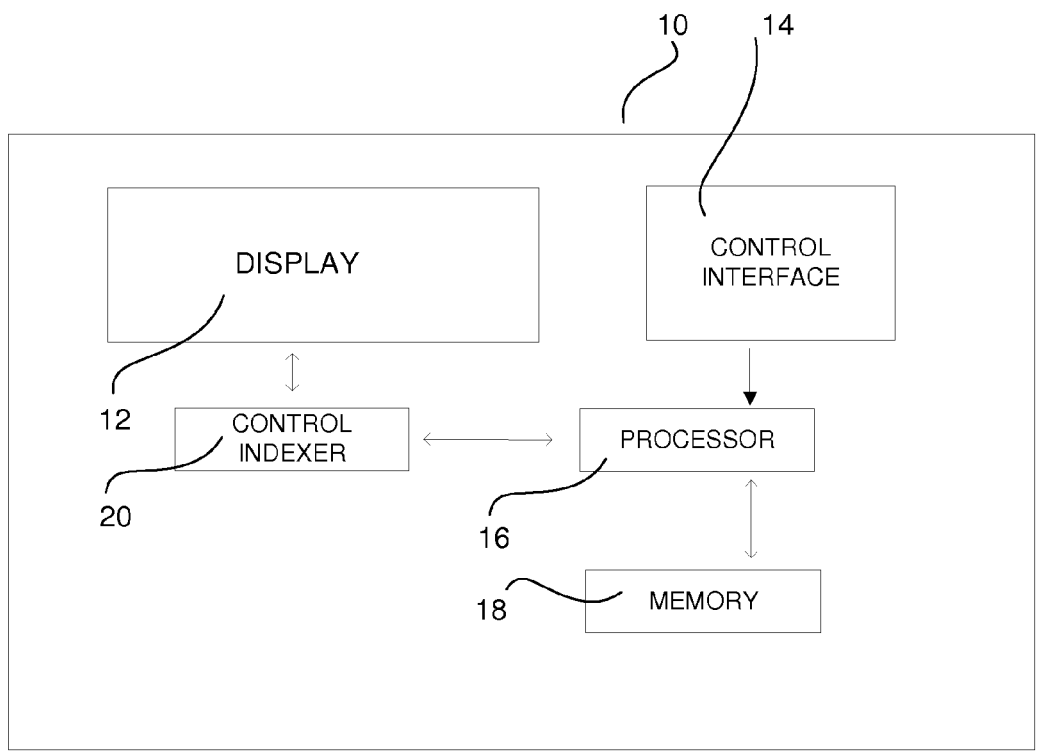
FIG. 1 illustrates a block diagram of a device such as a media player in accordance with an embodiment of the invention.
Figure 2:
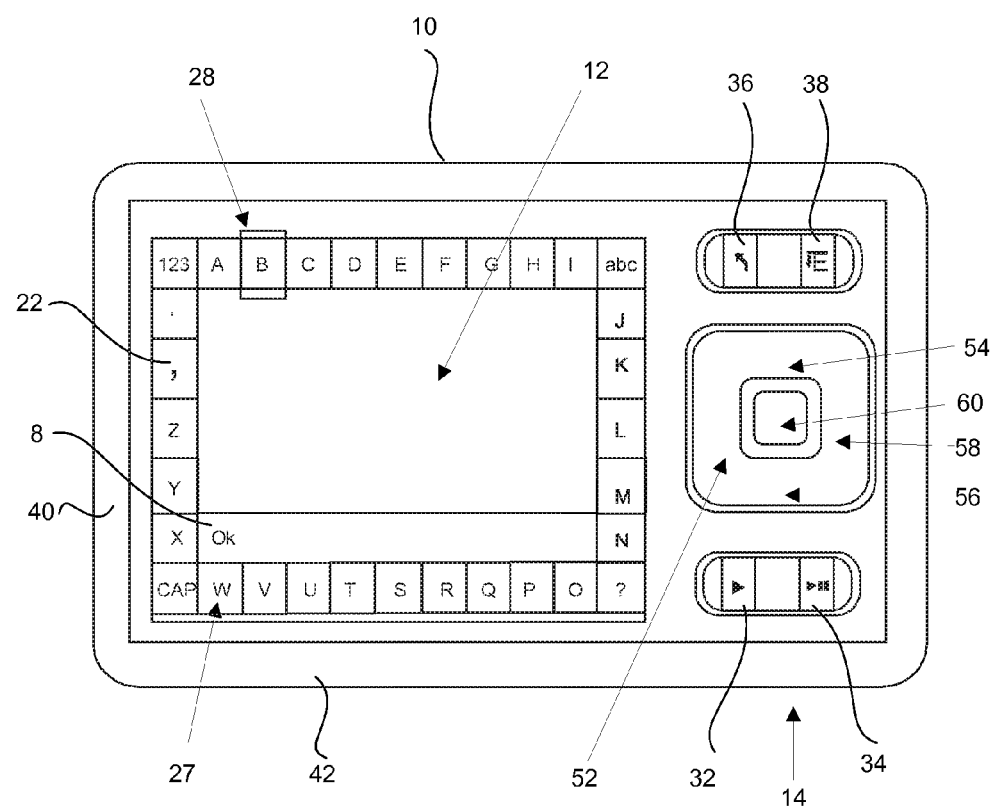
FIG. 2 is a schematic plan view of a front face of a media player device in accordance with an embodiment of the invention.

FIG. 1 shows a block diagram of a device 10 such as a media player in accordance with an embodiment of the invention, and FIG. 2 shows a front face of a device 10 in accordance with an embodiment of the invention. The device 10 comprises a housing 40 having a front face 42 with a display 12 and a control interface 14 which make up the external components on the device 10 for the data input mechanism of an embodiment. The control interface 14 is connected to a processor 16 and the processor 16 is connected to a memory 18. The processor is connected to the display via control indexer 20. Additional buttons may be arranged on the housing 40, for example the front face 42, such as "my shortcut" 32, play/pause 34, "previous screen" button 36, option menu 38, and the like. These additional buttons may be used for text input during a text input mode. In the text input mode, the additional buttons may have associated functions which are not denoted by symbols on the buttons. In a non-limiting example, the "my shortcut" button 32 may be a "backspace" button; the play/pause button 34 may be a "spacebar/next character" button; and the "previous screen" button 36 may be an "exit mode" button.

Figure 3:
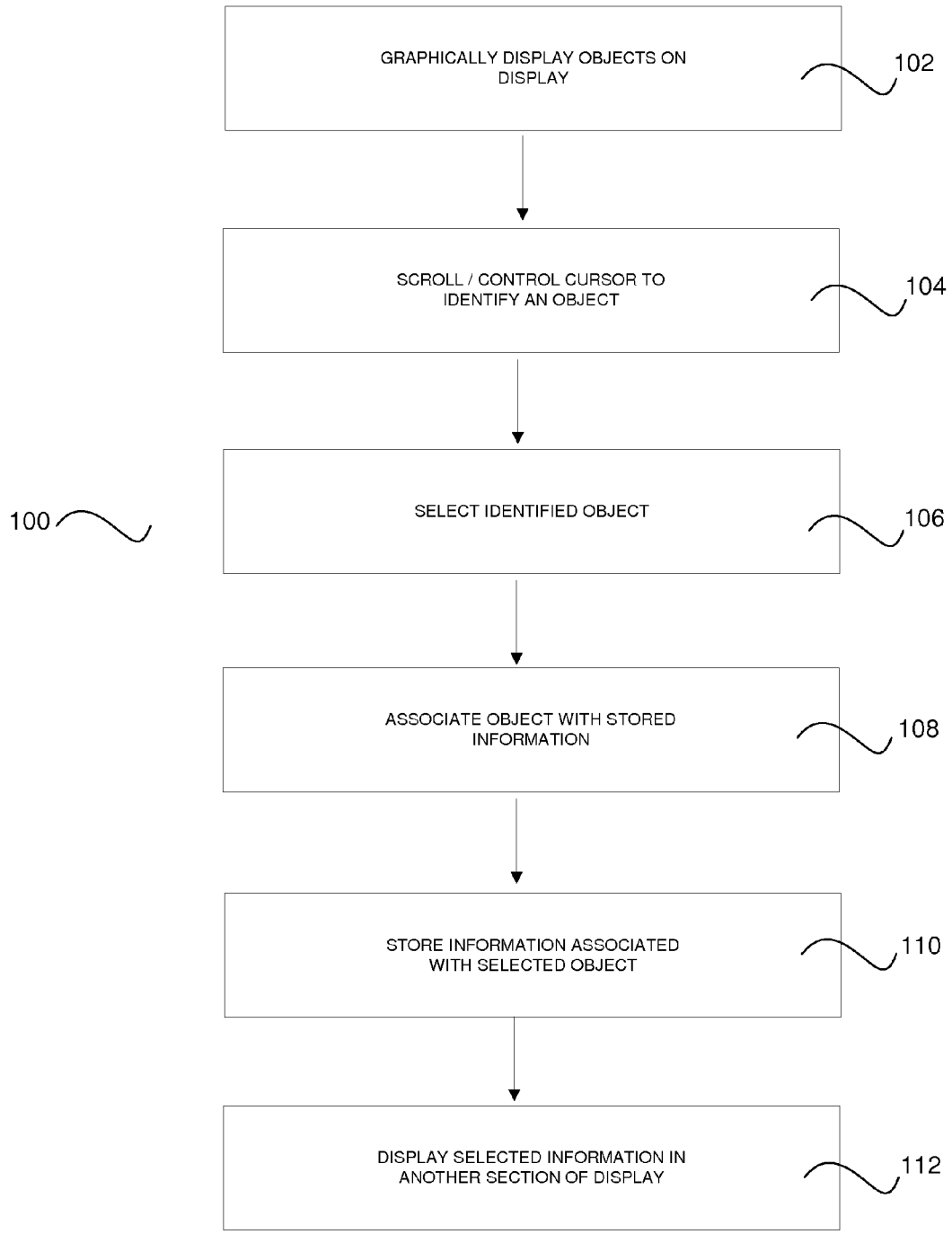
FIG. 3 is a flow chart of a method in accordance with an embodiment of the invention.

Referring to the flow chart of FIG. 3 of a method 100 in accordance with an embodiment of the invention, the processor 16 drives and graphically displays 102 a plurality of selectable characters or objects 22 stored in memory 18 on the display 12. The processor 16 also graphically displays a cursor 28 or an identifying means that highlights one of the selectable objects 22. The processor 16 via control indexer 20 moves the cursor 28 through the objects in response to manipulation of the control interface 14 by a user of the device 10. A user manipulates 104 the control interface 14 to move the cursor from object to object around the perimeter of the display 12. The user selects 106 the identified/desired object 22 with the control interface 14, specifically using selection button 60. The processor 16 associates 108 the selected object with information stored in memory 18. The selected information that is associated with the selected object is stored 110 in memory 18 in either a transient or permanent form. The selected information is displayed 112 by processor 16 on the display 12 in another section or portion 8 of the screen of the display 12. In this embodiment the other section or portion 8 is located within the perimeter of the plurality of objects in a centralized portion of the screen of the display 12, however, in other embodiments the selected information may be displayed outside of the perimeter in another area of the screen of the display 12 allocated to displaying the information input by the user.

The control interface 14 is arranged to scroll or control the cursor in response to the manipulation of the control interface 14. This movement may be relative to a midpoint or central point of the perimeter of the plurality of selectable objects 22. For example when the cursor 28 is located in the portion of the screen of the display 12 where the selectable objects 22 are displayed, when the control interface 14 is hit on a left portion 52, the cursor will move to the left side of the plurality of selectable objects 22, and subsequently, when the control interface 14 is hit (and held) on an "up" portion 54 or "down" portion 56, the cursor 28 will move upwards or downwards respectively within the left side of the plurality of objects 22. Hitting the selection button 60 will select the identified/desired object on the left side of the plurality of objects 22. After making the selection, the cursor 28 returns to the portion of the screen of the display 12, adjacent to where the last selected object from the left side of the plurality of objects 22 is displayed. Similarly, when the control interface 14 is hit on a right portion 58, the cursor will move to the right side of the plurality of objects 22, and subsequently, when the control interface 14 is hit (and held) on the "up" portion 54 or "down" portion 56, the cursor will move upwards or downwards respectively within the right side of the plurality of selectable objects 22. Hitting the selection button 60 will select the identified/desired object. After making the selection, the cursor 28 returns to the portion of the screen of the display 12, adjacent to where the last selected object from the right side of the plurality of objects 22 is displayed.

Figure 6A:
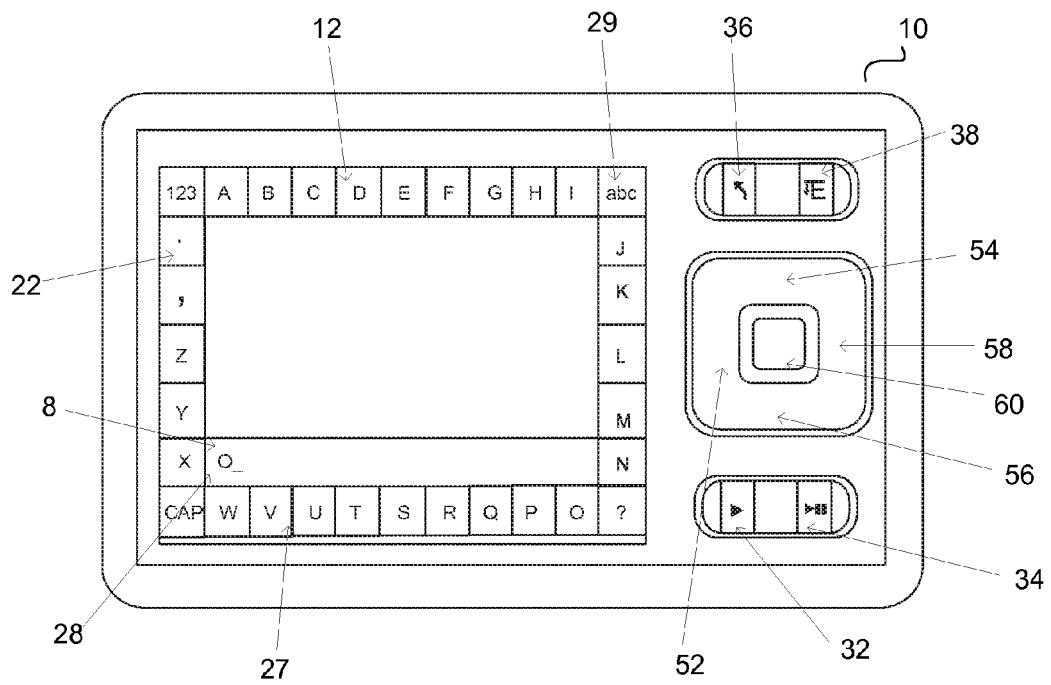
FIG. 6(a) and FIG. 6(b) show the control interface is used to input text into the media player.
Figure 6B:
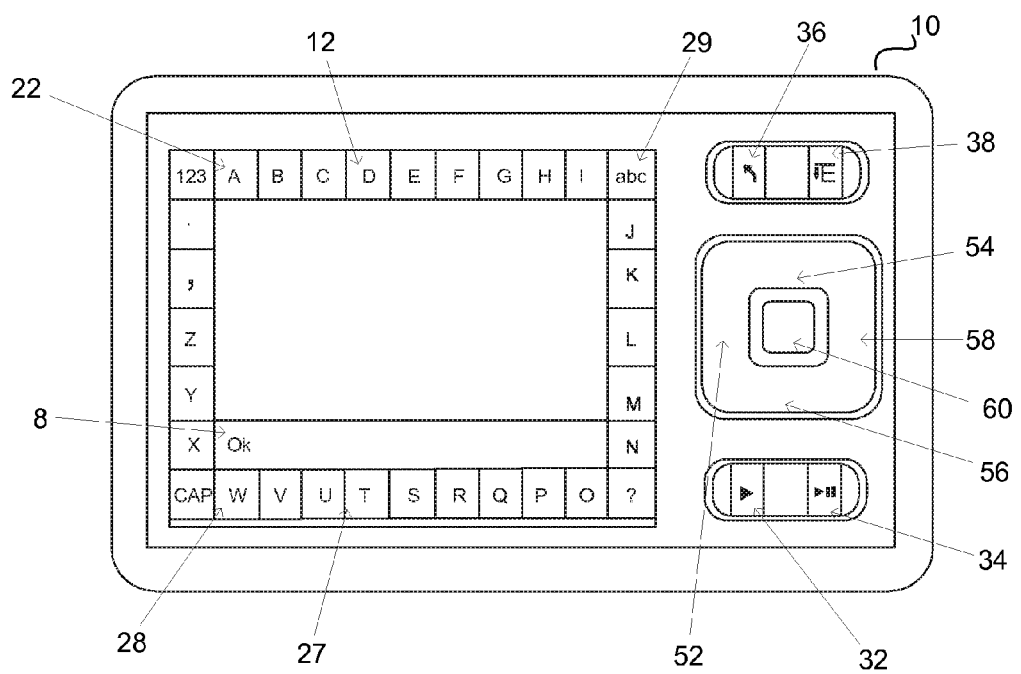

Referring to FIG. 6(a) and FIG. 6(b), examples of how text is entered into the device 10 are shown. The plurality of selectable objects 22 is shown to each represent an alphabet of the English language. It can be seen that each of the plurality of selectable objects 22 abuts two other objects. The alphabet "O" is denoted in FIG. 6(a) as a selected object in a lower portion 8 of the screen of the display 12 where selected objects are displayed. It can be seen that the object with alphabet "O" is found in a bottom row 27 of the plurality of objects 22. The following steps detail how the alphabet "O" is selected:

1. When the cursor 28 is at the lower portion 8 of the screen of the display 12 where selected objects are displayed, the user hits the down portion 56 of the control interface 14.
2. When the cursor 28 is at a centre of the bottom row 27 of the plurality of objects 22 (i.e. at the selectable object with alphabet "S"), the user hits (and holds) the right portion 58 of the control interface 14, wherein this action causes the cursor 28 to move rightwards from the object with alphabet "S" towards the object with alphabet "O".
3. When the cursor 28 reaches alphabet "O", the user hits the selector button 60 to select alphabet "O", and alphabet "O" is correspondingly shown at the portion 8 of the screen of the display 12 where selected objects are displayed.
4. The cursor 28 then resides adjacent to the displayed alphabet "O" as per the state shown in FIG. 6(a), Subsequent to the selection of the alphabet "O" in FIG. 6(a), the alphabet "K" is denoted in FIG. 6(b) as a selected object in the lower portion 8 of the screen of the display 12 where selected objects are displayed. It can be seen that the object with alphabet "K" is found in a right column 29 of the plurality of objects 22. The following steps detail how the alphabet "K" is selected:

1. When the cursor 28 is at the lower portion 8 of the screen of the display 12 where selected objects are displayed, the user hits the right portion 58 of the control interface 14.
2. When the cursor 28 is at a centre of the right column 29 of the plurality of objects 22 (i.e. at the object with alphabet "L"), the user hits (and holds) the up portion 54 of the control interface 14, wherein this action causes the cursor 28 to move upwards from the object with alphabet "L" towards the object with alphabet "K".
3. When the cursor 28 reaches alphabet "K", the user hits the selector button 60 to select alphabet "K", and alphabet "K" is correspondingly shown at the lower portion 8 of the screen of the display 12 where selected objects are displayed.
4. The cursor 28 then resides adjacent to the displayed alphabet "K" as per the state shown in FIG. 6(b), While the alphabet "K" is shown in a lower case form in FIG. 6(b), this may be because the processor 16 recognizes that it is not a start of sentence, and this may be as per one of the methods employed in known texting environments.

It will be appreciated that the plurality of selectable objects may be displayed in a single continuous row along the entire perimeter of the display as shown in FIG. 2. In this configuration each object abuts at least two other objects. In other embodiments the plurality of objects may be in different configurations such as double rows, or any number of rows and the like. However, a multi-row configuration typically adversely affects the precision of how a desired object is selected, and is not regarded as an optimal configuration for the present embodiment. In this regard, when the plurality of objects are displayed in a single continuous row prior to selection by the user, the user may only erroneously select the two abutting objects when attempting to select a desired object. It is evident that there are more adjacent objects when the plurality of objects is laid out in the multi-row configuration. As such, this increase in the number of adjacent objects typically leads to a higher incidence of errors when selecting the desired object.

The components of the device 10 may be a number of configurations. For example memory may be read only memory (ROM), flash memory, hard disk, optical disk, and the like. Display may be a monitor, liquid crystal display, cathode ray tube, plasma display or the like. Information of the objects may be alphanumeric characters such as letters in any number of languages such as English, Chinese characters, punctuation, mathematical expressions, scientific symbols and the like.

Figure 4:
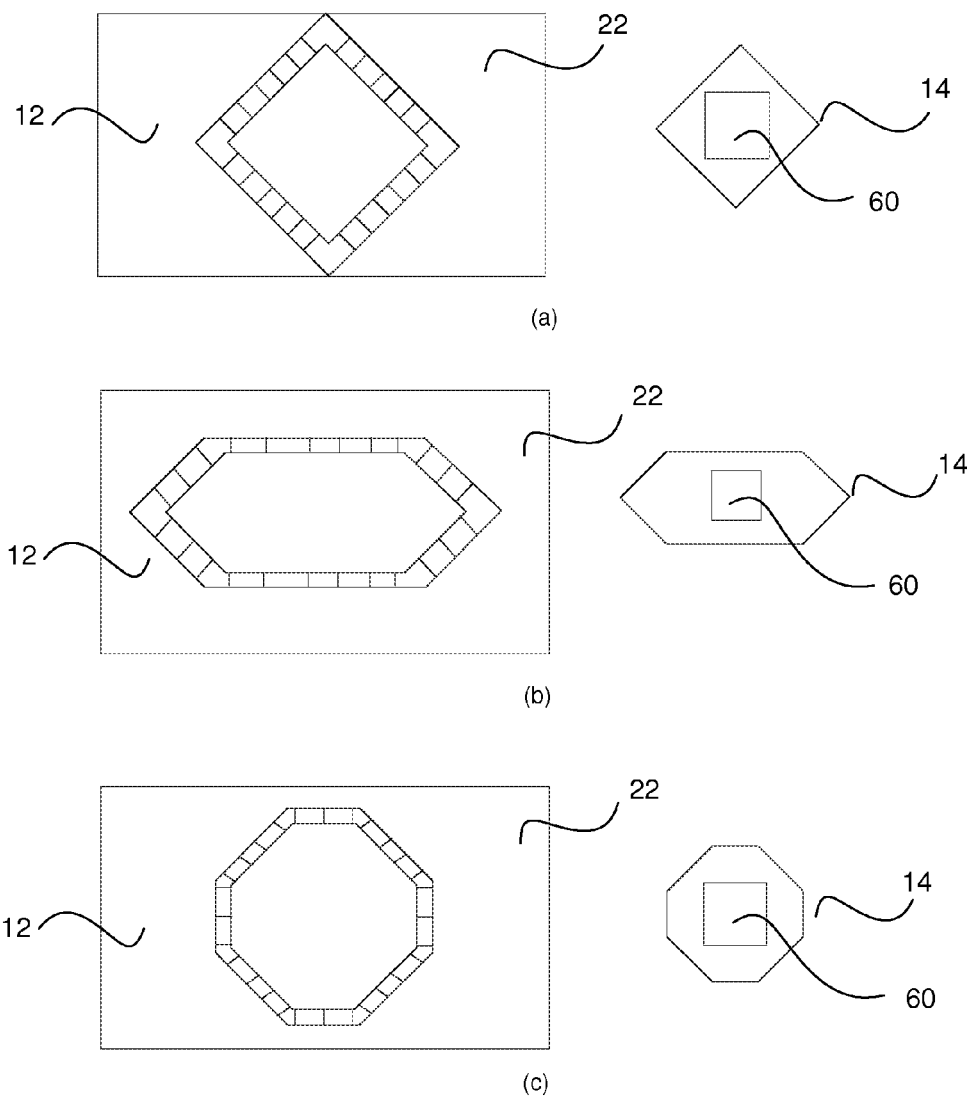
FIG. 4 shows examples of a control interface and corresponding displays on a screen.

The control interface 14 may be in a number of shapes as shown in FIG. 4. The shapes depicted in FIG. 4 are not limiting and are shown for illustrative purposes.

In FIG. 4(a), a diamond-shaped control interface 14 is shown, with the plurality of selectable objects 22 being arranged in a diamond-shaped arrangement on the screen of the display 12. In FIG. 4(b), a hexagonal control interface 14 is shown, with the plurality of selectable objects 22 being arranged in a hexagonal arrangement on the screen of the display 12. FIG. 4(c) shows an octagonal control interface 14, with the plurality of objects 22 being arranged in an octagonal arrangement on the screen of the display 12. It is evident from FIG. 4 that the plurality of objects 22 need not be arranged around the perimeter of the display 12. The method for selecting objects would be similar to when a rectangular control interface 14 is used as described in an earlier portion of this section. In the instances of the diamond-shaped and hexagonal control interfaces 14 as discussed earlier, apexes of the polygons may be used for up/down/left/right movement of the cursor 28 when selecting objects. In this regard, sides and apexes of the polygons may include tactile switches to accurately detect where the control interface 14 is hit by the user. It should be noted that regardless of shape of the control interface 14, the control interface 14 should still be able to enable the user to move the cursor 28 on the screen of the display 12 in the directions of up, down, left and right. It may also be possible for audio feedback to be provided to affirm selection of an object.

Figure 5:
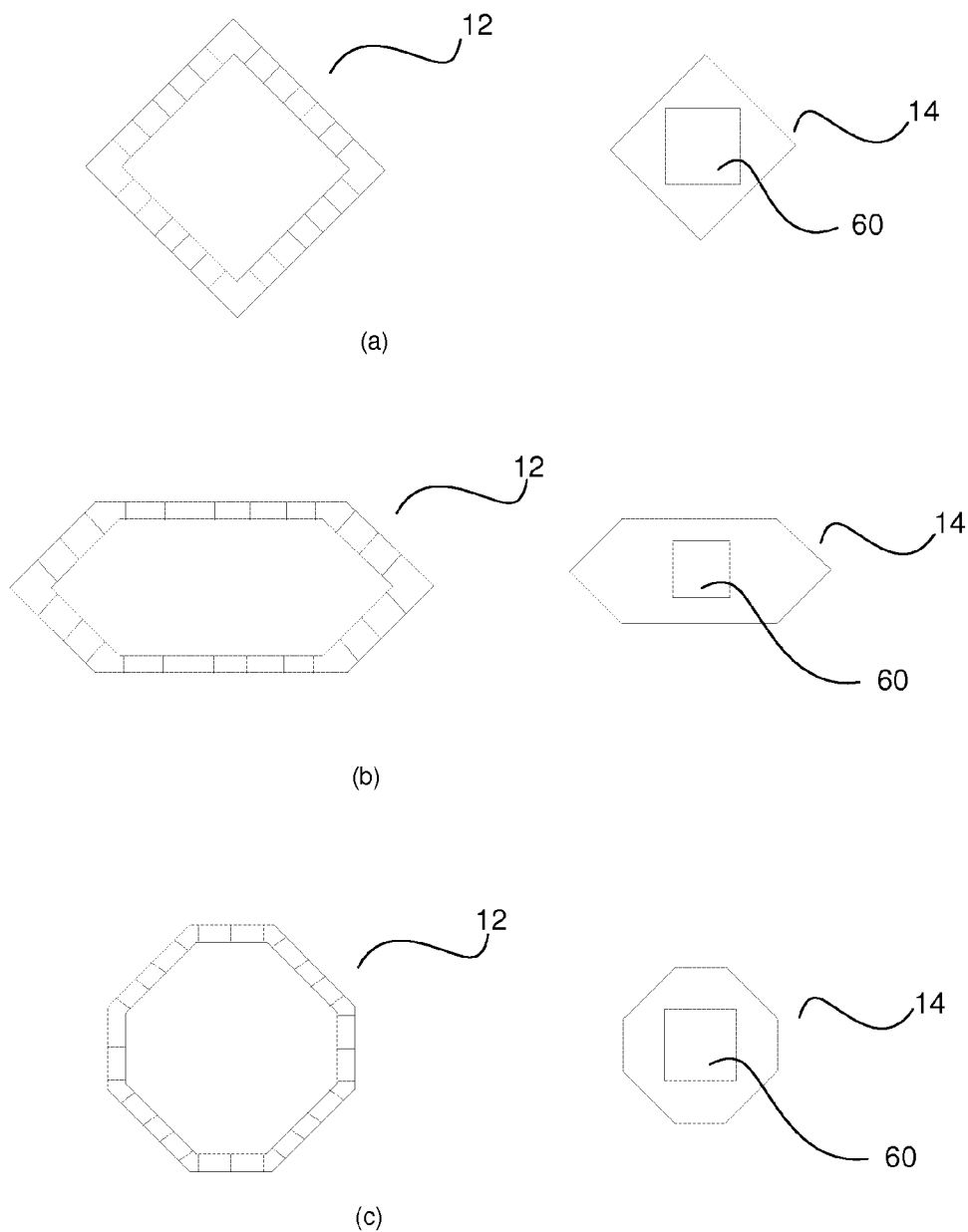
FIG. 5 shows examples of a control interface and corresponding similarly-shaped screens.

FIG. 5 shows examples where shapes of the display 12 correspond to shapes of the control interface 14. The plurality of objects 22 are shown around the perimeter of the display 12. The method for selecting objects would be similar to when a rectangular control interface 14 is used as described in an earlier portion of this section. In the instances of the diamond-shaped and hexagonal control interfaces 14 as discussed earlier, apexes of the polygons may be used for up/down/left/right movement of the cursor 28 when selecting objects. In this regard, sides and apexes of the polygons may include tactile switches to accurately detect where the control interface 14 is hit by the user. It should be noted that regardless of shape of the control interface 14, the control interface 14 should still be able to enable the user to move the cursor 28 on the screen of the display 12 in the directions of up, down, left and right. It may also be possible for audio feedback to be provided to affirm selection of an object.

While embodiments of the invention have been described and illustrated, it will be understood by those skilled in the technology concerned that many variations or modifications in details of design or construction may be made without departing from the present invention.

The invention claimed is:

1. An apparatus for input of information in an electronic device having a display, the apparatus comprising:
 a processor for displaying around the perimeter of the display a plurality of objects representative of the information to be input, displaying on the display at a location within the perimeter an area where information represented by selected objects of the plurality of objects are to be displayed, and displaying in the area a cursor; and
 a control interface for a user to select an object from the plurality of objects for input by moving the cursor from the area to the plurality of objects arranged around the perimeter, scrolling through the plurality of objects for highlighting at least one of the plurality of objects, and selecting a highlighted object for input;
 wherein selecting a highlighted object for input causes information that the highlighted object represents to be displayed as input in the area and the cursor to be repositioned to the area adjacent the displayed information for subsequent control by the user to select an additional object from the plurality of objects for input.

2. The apparatus of claim 1 further comprising a memory for storing the information input, and the processor displaying the information selected with the control interface on the display.

3. The apparatus of claim 1 where the perimeter formed by the plurality of objects is in the form of a quadrilateral.

4. The apparatus of claim 1 wherein the control interface comprises at least one button.

5. The apparatus of claim 4 wherein the movement of the cursor is dependent on user input based on one of the at least one button.

6. The apparatus of claim 1 wherein the movement of the cursor is dependent on the relative position of the cursor in relation to a midpoint of the screen and a contact position of the control interface.

7. The apparatus of claim 1 wherein the plurality of objects are displayed in a single row along the perimeter.

8. The apparatus of claim 1 wherein the plurality of objects are displayed in a single continuous row along the perimeter, with each object abutting two other objects.

9. The apparatus of claim 1 wherein the objects displayed on the screen are selected from a group consisting of: alphanumeric characters, Chinese characters, punctuation, mathematical expressions, scientific symbols and any combination of the aforementioned.

* * * * *